Nov. 28, 1933.        J. R. OISHEI        1,937,160
DUAL WIPER PARKING WINDSHIELD CLEANER
Filed Oct. 13, 1930
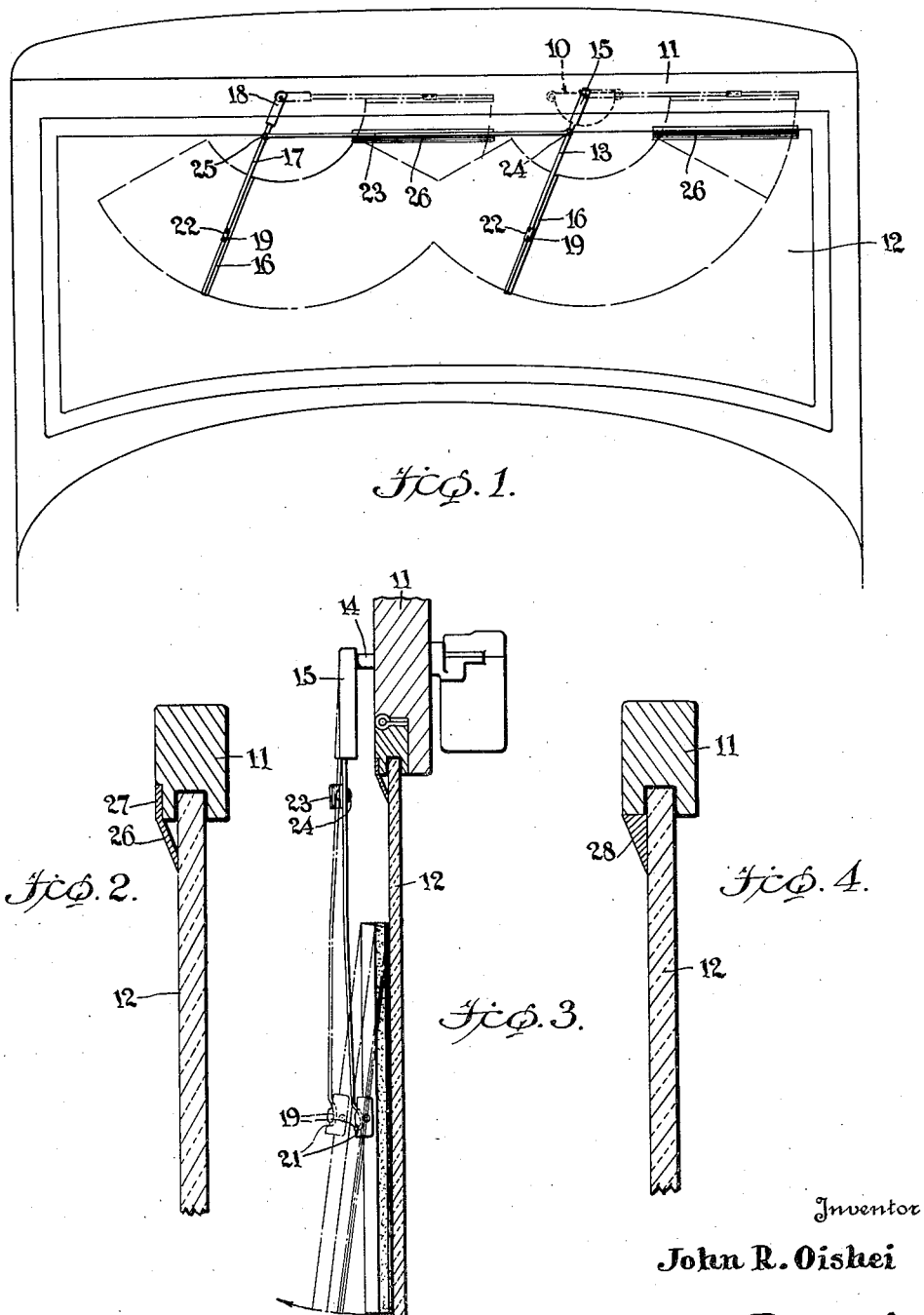
Inventor
John R. Oishei
By Barton A. Bean Jr.
Attorney Patented Nov. 28, 1933

1,937,160

UNITED STATES PATENT OFFICE 1,937,160

DUAL WIPER PARKING WINDSHIELD CLEANER

John R. Oishei, Buffalo, N. Y., assignor to Trico Products Corporation, Buffalo, N. Y.

Application October 13, 1930. Serial No. 488,503

6 Claims. (Cl. 15—255)

This invention relates to windshield cleaners and to a manner of mounting the same on motor vehicles.

Windshield cleaners conventionally comprise an actuating motor and one or more wiper blade carrying arms mounted on the header bar immediately above the vehicle windshield, each blade being adapted for reciprocation by the motor and arms in an arcuate path over the windshield, about the pivotal point of the wiper arm on the header bar. When not in use the arms and blades are moved to their uppermost positions adjacent the header bar, or as far from the driver's line of vision through the windshield as possible. However, as the header bars project forwardly beyond the windshield, the wiper blades cannot be moved in their regular plane of movement to a position parallel with the header bar and entirely above the windshield but must be moved forwardly and then upwardly to reach such position completely out of the entire field of vision through the windshield.

It is desirable from the standpoints of driving comfort and appearance of the vehicle to dispose the wiper arms and blades away from the windshield when they are not being used and various means to accomplish this result have been proposed such as those shown in Patents Nos. 1,662,207 and 1,693,665 wherein the wiper arm may be moved outwardly when the blade reaches a position adjacent the overhanging header bar and thence upwardly. In certain wiper arm and wiper blade constructions such as shown in Patent No. 1,778,256, the blade is retained on the arm by the latter pressing the blade against the windshield and is removable upon movement of the arm away from the windshield. For this reason the means heretofore known for elevating the blades above the windshield cannot be successfully used with wiper arms and blades of the type disclosed in the co-pending application, since the necessary outward movement of the arm would allow the blade to become disengaged and to drop from the arm. Where a plurality of such blades are used on a single vehicle, they are usually carried by spaced wiper arms pivoted adjacent the header bar and held during periods of rest and movement in parallel relationship by a connecting link. The latter comprises a relatively light wire or rod and outward movement of one wiper arm could not effect, through the link, outward movement of corresponding magnitude of the other wiper arm or arms.

The present invention contemplates windshield cleaners and cam means associated therewith whereby the wiping blades, one or more of which may be mounted on a single vehicle, may be actuated by the cleaner motor in the usual manner over the vehicle windshield, and which when not in use may be parked entirely above the windshield, the pressure of the arm against the wiper blade being effective during movement of the blade from wiping to parked position to retain the blade on the arm. When a plurality of blades are used on a single vehicle they may be simultaneously moved to a parked position in which blades, arms and connecting links will all be disposed above the windshield and out of the field of vision therethrough.

These and other objects and advantages will become apparent from a perusal of the following description of typical devices embodying the principles of the invention, reference being made to the accompanying drawing wherein:—

Fig. 1 is a front elevation of a motor vehicle and showing the windshield wiper according to the present invention mounted on the header bar immediately above the windshield;

Fig. 2 is a vertical cross section taken through the windshield and header bar and showing the cam means employed in the present invention for maintaining the pressure between the arm and wiper blade while the latter is being moved to parked position;

Fig. 3 is a cross sectional view taken through the windshield and header bar and showing the windshield cleaner and the mode of disengaging the wiping blade therefrom; and Fig. 4 is a view similar to Fig. 2 showing modified cam means.

As shown in Figs. 1 and 3, the cleaner comprises an actuating motor 10, mounted on the windshield header bar 11 which is disposed immediately above and extends forwardly beyond the windshield 12. A wiper blade arm 13 is secured to the motor rock shaft 14 by suitable spring means 15 and carries a removable wiper blade 16. Another arm 17 similar to that shown at 13, is pivotally mounted on the header bar 11 by means 18, similar to those indicated at 15, and carries another blade 16. The arms 13 and 17 are provided with hooked ends 19 adapted to engage in openings 21, formed in the back members 22 which are attached to the blades 13, and are adapted to be pressed by the means 15 and 19 respectively against the blades to retain the latter and hold them firmly against the windshield 12. The blades may be removed from the arms upon outward movement of the latter as indicated in broken lines in Fig. 3, such movement allowing the arm end 19 to become disengaged from the apertures 21.

The motor 10 is designed to reciprocate the rock shaft 14 and arm 13, in normal operation, through an arc of substantially less than 180° as indicated in broken lines in Fig. 1. The arm 17 is maintained in parallel relationship to the arm 13 during periods of movement and rest by a connecting rod or link 23 pivotally connected to the arms at 24 and 25. The motor or hand operable means associated therewith are adapted, upon discontinuation of the normal wiping operation with the arms 13 and 17, carrying the blades 16 over the windshield in an arcuate path, to continue the movement in one direction until the rock shaft 14 and arms 13 and 17 are brought to their uppermost level or parking position, indicated in broken lines of Fig. 1, in which the arms 13 and 17 and the blade 16 are substantially parallel to the header bar and link 23.

In order to permit of movement to this position past the overhanging forward edge of the header bar, a pair of cam strips 26 are provided along the lower edge of the header bar and in the path of the wiper blade. These strips preferably are of length substantially equal to that of the blade but may be shorter, longer, or coextensive with the header bar if desired. As illustrated in Fig. 2 the strip 26 comprises a lower inclined portion extending upwardly from the plane of the windshield to the plane of the outer or forward header bar surface and an upper flange portion 27 adapted for securement to the header bar 11. In Fig. 4 a modified cam 28 is depicted which comprises a molding strip preferably of light metal or composite material which is secured in any desired manner to the lower surface of the header bar and which provides a sloping or inclined surface extending from the forward surface of the windshield to the forward surface of the header bar.

Upon discontinuance of the normal windshield wiping operation the continued movement of the arms 13 and 17 will carry the blades 16 over the cam surfaces 26 to the position above the windshield. The cams will, during this upward movement, cause the blades 16 to move outwardly against the spring pressure of the wiper arms 13 and 17 and the respective spring means 15 and 18. These spring means will firmly press the arm against the blade preventing accidental disengagement of the parts and will aid in the retention of the blade in parked position.

It will now be understood that the present invention provides a simple and practical means for simultaneously positioning a plurality of operably connected wiper blades and actuating arm and link mechanisms entirely above the windshield and away from the field of vision therethrough when the cleaner is not in use. The blades, constantly pressed against the windshield, cam surfaces, or header bar, are retained at all times under the spring pressure exerted through the arm in the same manner as in normal operation. It will be further understood that the devices herein described are merely illustrative of the principles of the invention which is defined as to scope by the appended claims.

What is claimed is:

1. In combination with a vehicle having a windshield and an overhanging header bar, a pair of arms mounted on said header bar for pivotal movement about an axis normal to the plane of said windshield, a wiper blade carried by and pressed against said windshield by each of said arms, a link connecting said arms for simultaneous pivotal movement, and an inclined surface between said windshield and header bar and suspended from the latter in the path of movement of each of said wiper blades, whereby movement of one of said arms may be effective to carry said blades and cross member to a position overlying said header bar.

2. In combination with a vehicle having a windshield and a header bar, a windshield cleaner comprising a wiper blade and a carrying arm therefor, said blade being detachably interlocked with the arm and held operatively connected therewith by the resilient pressure of the arm holding the blade against the windshield, said arm being mounted for arcuate movement about an axis substantially normal to said windshield and to resiliently press said blade inwardly toward said windshield, and inclined means in the path of arcuate movement of said wiper blade, said inclined means substantially merging the forward surfaces of said windshield and header bar and engageable with the blade for substantially its entire length, whereby movement of said arm about said axis will be effective to move said blade from engagement with the windshield to engagement with the header bar and whereby the resilient pressure of the arm will hold the blade against the inclined means and thereby retain the blade operatively connected during movements of the blade between the windshield and header bar.

3. In combination with a windshield cleaner comprising a multiplicity of wiper blades acting on the front surface of the windshield glass, and means acting to synchronize the movements of the multiplicity of wiper blades, of wiper parking means arranged in the paths of the blades to be traversed thereby individually and acting upon said plural blades by and during movement thereof for parking said multiplicity of blades beyond their normal path of movement and in a plane spaced from the plane of the glass.

4. In combination with a windshield, a cleaner therefor having an oscillatory wiper carrying arm, a wiper, means detachably interlocking and connecting the wiper to the arm, resilient means for urging the arm toward the windshield glass to maintain the wiper in wiping contact with the glass and also to hold said interlocking connecting means operative, said windshield having a raised frame and said arm having a parking movement from the glass to a point on the raised frame, and track means providing a continuous and uninterrupting track from the glass surface to the parking surface of the frame for guiding the wiper to and from its parked position, said track means being arranged in the path of the parking wiper to be engaged and traversed by the wiper under the tension of said resilient means whereby said track means will retain the detachable connecting means operative during movement to and from said parking surface of the frame.

5. In combination with a vehicle having a windshield and supporting frame structure adjacent thereto, a windshield cleaner comprising a wiper blade and a carrying arm therefor adapted to exert a resilient pressure thereagainst, said blade being detachably interlocked with the arm and held operatively connected therewith by the resilient pressure of the arm holding the blade against the windshield, said arm being mounted for arcuate movement about an axis substantially normal to said windshield and to resiliently press said blade inwardly toward said windshield, and means in the path of arcuate movement of said wiper blade, said means substantially merging the forward surfaces of said windshield and said supporting frame structure and engageable with the blade for substantially its entire length, whereby movement of said arm about said axis will be effective to move said blade from engagement with the windshield to engagement with the supporting frame structure and whereby the resilient pressure of the arm will hold the blade against the means and thereby retain the blade operatively connected during movements of the blade between the windshield and the supporting frame structure.

6. In combination with a windshield, a cleaner therefor having an oscillatory wiper carrying arm, a wiper carried by the arm, resilient means for urging the arm toward the windshield glass to maintain the wiper in wiping contact with the windshield glass, said windshield having a raised frame and said arm having a parking movement from the glass to a point on the raised frame, and cam means providing a connecting surface between the glass surface and the parking surface of the frame for guiding the wiper to and from its parked position, said cam means being arranged in the path of the parking wiper to be engaged and traversed by the wiper under the tension of said resilient means.

JOHN R. OISHEI.